J. BJORNLIE.
TIRE TOOL.
APPLICATION FILED NOV. 26, 1917.

1,279,076.

Patented Sept. 17, 1918.
2 SHEETS—SHEET 1.

WITNESSES
H. L. Opsahl.
B. G. Wheeler

INVENTOR
J. BJORNLIE.
BY HIS ATTORNEYS.
Williamson Merchant

J. BJORNLIE.
TIRE TOOL.
APPLICATION FILED NOV. 26, 1917.
1,279,076.
Patented Sept. 17, 1918.
2 SHEETS—SHEET 2.
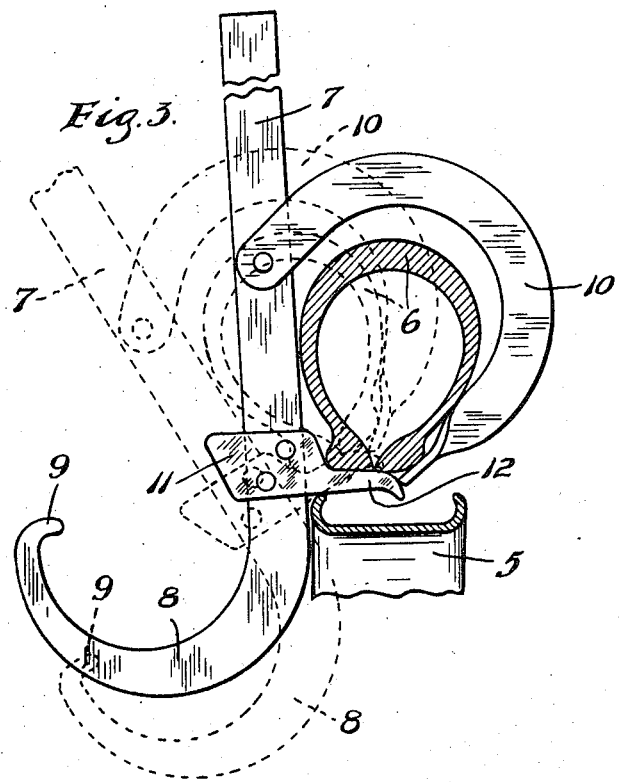
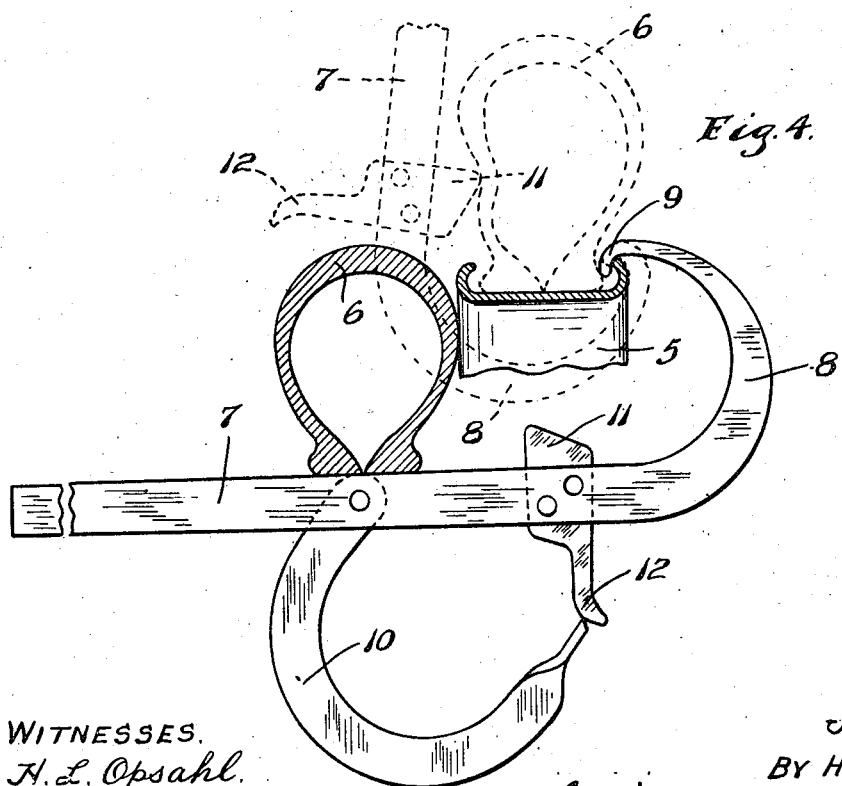
WITNESSES.
H. L. Opsahl.
B. G. Wheeler
INVENTOR
J. BJORNLIE.
BY HIS ATTORNEYS
Williamson Merchant

UNITED STATES PATENT OFFICE.

JULIUS BJORNLIE, OF WATERTOWN, SOUTH DAKOTA, ASSIGNOR OF ONE-HALF TO THORWALD BJORNLIE, OF MADISON, MINNESOTA.

TIRE-TOOL.

1,279,076.

Specification of Letters Patent. Patented Sept. 17, 1918.

Application filed November 26, 1917. Serial No. 204,059.

*To all whom it may concern:*

Be it known that I, JULIUS BJORNLIE, a citizen of the United States, residing at Watertown, in the county of Codington and State of South Dakota, have invented certain new and useful Improvements in Tire-Tools; and I do hereby declare the following to be a full, clear, and exact description of the invention, such as will enable others skilled in the art to which it appertains to make and use the same.

My invention has for its object to provide an extremely simple and convenient tool for use in applying pneumatic tire casings to wheel rims and the removal of the same therefrom. To the above end, the invention consists of the novel devices and combinations of devices hereinafter described and defined in the claim.

In the accompanying drawings, which illustrate the invention, like characters indicate like parts throughout the several views.

Referring to the drawings,

Figs. 2 and 3 are views corresponding to Fig. 1, but illustrating further steps in the removal of the casing from the wheel rim; and Fig. 4 is a view corresponding to the other view, but illustrating the tool as used in mounting the casing on the wheel rim.

Figure 1:
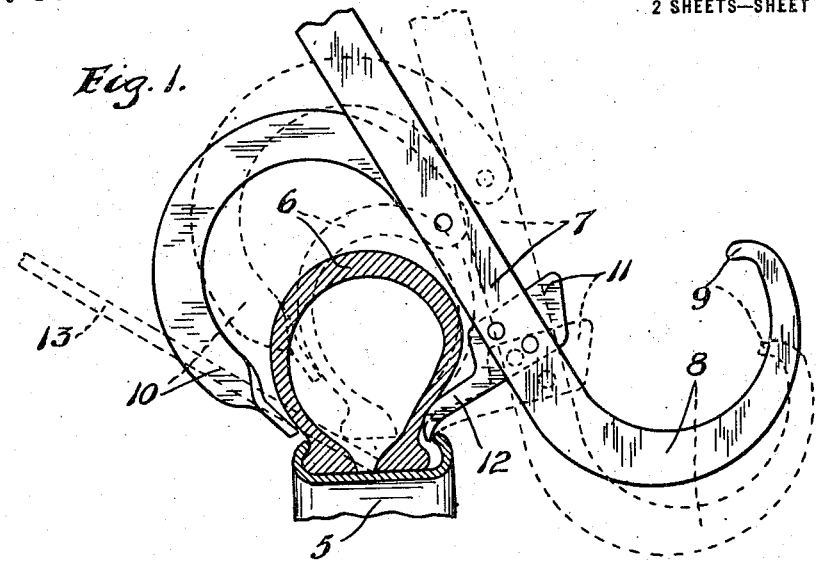
Figure 1 is a fragmentary view, partly in side elevation and partly in transverse section, illustrating the improved tool as used in removing a tire casing from a wheel rim.

The numerals 5 and 6 indicate, respectively, a wheel rim to which is secured a tire casing of the clencher type. The improved tire tool comprises a lever 7, in the form of a flat bar having one of its end portions bent edgewise, on a relatively large curve, to afford an arm 8. The free end of this arm 8 is bent toward the lever 7 to form a wheel rim-engaging member 9.

A movable grapple 10 is pivoted to the lever 7, at one side thereof, for swinging movement on the opposite edge of the lever 7 from the arm 8. It will be noted that the free end of the arm 8 and grapple 10 extend in opposite directions, and, together with the intervening portion of the lever 7, have a substantially S-shaped formation. The free end of the movable grapple 10 is twisted to bring the same into a position in which its greatest dimension will engage the tire circumferentially.

Coöperating with the arm 8, is a tire-engaging shoulder 11 and coöperating with the movable grapple 10, is a prying finger 12, which also affords the fulcrum for the lever 7. As shown, the shoulder 11 and finger 12 are integrally formed and rigidly secured to the lever 7 between the arm 8 and grapple 10, but, if desired, may be integrally formed with said lever.

In removing the casing 6 from the rim 5, the first step is to apply the finger 12 on one of the rolled edges of said rim, as shown in Fig. 1. The free end of the movable grapple 10 is then placed against the opposite side of the casing 6 from the finger 12. With the tool thus applied in working position, the lever 7 is moved into a position, as indicated by broken lines in Fig. 1. This movement of the lever 7 will cause the movable grapple 10 to force the adjacent side of the casing 6 out of interlocking engagement with the rim 5 and lift the same therefrom, as shown in Fig. 1. With one side of the casing 6 thus lifted, a bar 13 is inserted between the lifted side of said casing and the rim 5.

Figure 2:
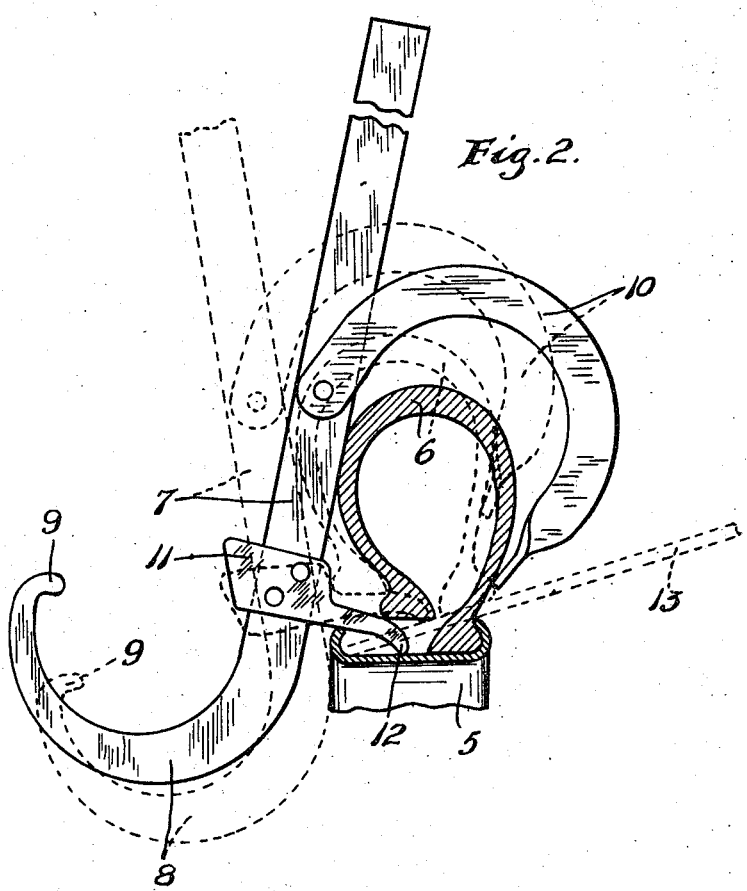

A further step in removing the casing 6 from the rim 5 is to shift the tool to the other side of said rim and remove the respective side of said casing in the same manner that the other side thereof is removed. In thus shifting the tool, the finger 12 slips in under the side of the casing 6, held raised by the bar 13, and takes the place of said bar. Said bar 13 may then be used on the other side of the casing 6 and, together with the finger 12, holds the engaged portion of the casing 6 out of engagement with the rim 5, as indicated by broken lines in Fig. 2. With a portion of the casing 6 thus lifted from the rim 5, the movable grapple 10 is moved into a position, as indicated by full lines in Fig. 3, wherein its free end engages the finger 12 and, together with said finger, completely embraces the casing 6. Then by moving the lever 7 into a position, as indicated by broken lines in Fig. 3, the casing 6 may be pulled laterally from the rim 5.

To replace the casing 6 on the rim 5, said casing is first placed on the rim by hand as far as it will go. The rim-engaging member 9 on the arm 8 is then interlocked with one edge of the rim 5, with the casing 6 resting on the lever 7, as indicated by full lines in Fig. 4. Then by lifting the lever 7, the casing 6 is forced onto the rim 5. During the initial lifting movement of the lever 7, the casing 6 will slip thereon, until the same engages the shoulder 11. The final lifting movement of the lever 7 will force the casing 6 laterally onto the rim 5 and, at the same time, the shoulder 11 will move out of engagement with the inner portion of the tire 6, as indicated by broken lines in Fig. 4.

What I claim is:—

A tire tool comprising a hook portion adapted to engage one edge of a tire rim and a tire supporting portion extending substantially tangentially to the hook portion so that when the hook portion is engaged with the rim the tire supporting portion may extend through the rim to engage both edges of the tire and be swung to extend outwardly from the rim in substantially a radial direction to force the tire on the rim, and a stop at the junction of the hook portion and the tire supporting portion to prevent the tire slipping into the hook portion during the swinging of the tool, but permittitng it to slip onto the rim when the tool is in its final position.

In testimony whereof I affix my signature in presence of two witnesses.

JULIUS BJORNLIE.

Witnesses:
CLARA DEMAREST,
HARRY D. KILGORE.